(12) United States Patent
Lee et al.

(10) Patent No.: US 8,054,272 B2
(45) Date of Patent: Nov. 8, 2011

(54) DISPLAY APPARATUS

(75) Inventors: Chang-Soo Lee, Uijeongbu-si (KR); Yu-Han Bae, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 461 days.

(21) Appl. No.: 12/412,070

(22) Filed: Mar. 26, 2009

(65) Prior Publication Data

US 2010/0053056 A1 Mar. 4, 2010

(30) Foreign Application Priority Data

Aug. 29, 2008 (KR) .................. 10-2008-0085401

(51) Int. Cl.
*G09G 3/36* (2006.01)
(52) U.S. Cl. ............................. 345/94; 345/87
(58) Field of Classification Search ............ 345/87–100, 345/204
See application file for complete search history.

(56) References Cited

U.S. PATENT DOCUMENTS

| | | | | |
|---|---|---|---|---|
| 6,756,958 B2 * | 6/2004 | Furuhashi et al. | ............... | 345/95 |
| 7,224,353 B2 * | 5/2007 | Song et al. | ............... | 345/211 |
| 7,349,055 B2 * | 3/2008 | Lee et al. | ............... | 349/152 |
| 7,463,324 B2 * | 12/2008 | Jung et al. | ............... | 349/149 |
| 7,502,020 B2 * | 3/2009 | Kim et al. | ............... | 345/211 |
| 7,750,888 B2 * | 7/2010 | Song et al. | ............... | 345/103 |
| 7,773,187 B2 * | 8/2010 | Takenaka et al. | ............... | 349/150 |
| 7,786,960 B2 * | 8/2010 | Jung et al. | ............... | 345/87 |
| 7,830,371 B2 * | 11/2010 | Song et al. | ............... | 345/212 |
| 7,851,996 B2 * | 12/2010 | Nakamura et al. | ............... | 313/506 |
| 7,898,514 B2 * | 3/2011 | Kim | ............... | 345/92 |
| 7,916,134 B2 * | 3/2011 | Morita | ............... | 345/212 |
| 7,956,833 B2 * | 6/2011 | Ito et al. | ............... | 345/87 |
| 7,961,179 B2 * | 6/2011 | Murata | ............... | 345/205 |
| 2004/0108985 A1 * | 6/2004 | Song | ............... | 345/87 |
| 2005/0212735 A1 * | 9/2005 | Lin | ............... | 345/87 |
| 2008/0136795 A1 * | 6/2008 | Numao et al. | ............... | 345/204 |
| 2008/0273003 A1 * | 11/2008 | Jeon | ............... | 345/99 |

FOREIGN PATENT DOCUMENTS

| | | |
|---|---|---|
| JP | 11-288001 | 10/1999 |
| KR | 1020010008893 | 2/2001 |
| KR | 1020050086921 | 8/2005 |
| KR | 1020070060660 | 6/2007 |

* cited by examiner

*Primary Examiner* — Nitin Patel
(74) *Attorney, Agent, or Firm* — F. Chau & Associates, LLC

(57) ABSTRACT

A display apparatus includes a gate driver, a data driver, a display panel, a power supply and a common voltage line. The gate driver outputs a gate signal, and the data driver outputs a data signal. The display panel includes a display area displaying images in response to the gate signal and the data signal, and a peripheral area surrounding the display area. The power supply generates a common voltage and supplies the common voltage to the display panel. The common voltage line is disposed in the peripheral area surrounding the display area. and the common voltage line has two ends adjacent to the power supply. One of the two ends, which is disposed farther away from the gate driver, is connected to the power supply to receive the common voltage. Accordingly, the common voltage is differentially applied according to a length of the common voltage line.

20 Claims, 3 Drawing Sheets

DISPLAY APPARATUS

CROSS-REFERENCE TO RELATED APPLICATION

This application claims priority to Korean Patent Application No. 2008-85401, filed on Aug. 29, 2008, the disclosure of which is incorporated by reference in its entirety herein.

BACKGROUND

1. Technical Field

The present disclosure relates to a display apparatus. More particularly, the present disclosure relates to a display apparatus having improved image display quality.

2. Discussion of Related Art

A liquid crystal display displays desired images by forming an electric field between two substrates and adjusting the amount of light passing through liquid crystals interposed between the two substrates. In the liquid crystal display, a plurality of gate lines, a plurality of data lines and a plurality of pixels may be provided at a lower substrate of the two substrates and a common electrode may be provided at an upper substrate of the two substrates. The liquid crystal display may sequentially drive the gate lines such that a data voltage applied to the data lines is provided to the pixels connected to the gate lines.

A signal delay may occur in the gate lines due to a parasitic capacitance and an interconnection resistance. The signal delay may cause voltage of a data line to shift. This shift in voltage may be referred to as a kickback voltage, which can cause a flicker in a screen of the liquid crystal display.

Thus, there is a need for a liquid crystal display which can reduce or prevent the flicker caused by a kickback voltage.

SUMMARY

In an exemplary embodiment of the present invention, a display apparatus includes a gate driver, a data driver, a display panel, a power supply and a common voltage line. The gate driver outputs gate signals, and the data driver outputs data signals. The display panel includes a display area to display images in response to the gate signal and the data signal, and a peripheral area surrounding the display area. The peripheral area includes a first peripheral area disposed above the display area and a second peripheral area disposed below the display area. The power supply generates a common voltage and supplies the common voltage to the display panel. The common voltage line is disposed through the peripheral area and surrounds the display area. The common voltage line has two ends adjacent to the power supply. One of the two ends, which is disposed farther away from the gate driver than the other one of the two ends, is connected to the power supply to receive the common voltage.

The display panel may include a spacer interposed between the common voltage line and the common electrode. The spacer may overlap the common voltage line such that the spacer is connected to the common electrode. The end of the common voltage line disposed farther away from the gate driver may be connected to the power supply and may receive the common voltage such that the common voltage may be differentially applied to the display panel according to a length of the common voltage line. Thus, a difference in a kick back voltage generated on the display panel can be compensated through the differential application of the common voltage, thereby preventing or reducing display defects such as a flicker.

In another exemplary embodiment of the present invention, a display apparatus includes a display panel, a power supply, a common voltage line, and at least one spacer. The display panel includes a display area to display an image and a peripheral area surrounding the display area. The power supply generates a common voltage and supplies the common voltage to the display panel. The display panel includes a first substrate, a second substrate facing the first substrate, and a liquid crystal layer interposed between the first substrate and the second substrate. The common voltage line is disposed through the peripheral area surrounding the display area. The spacers are interposed between the first substrate and the second substrate and overlap the common voltage line.

The display apparatus may further include a pad electrode disposed between the common voltage line and each spacer. Each spacer may comprise a material having a polygonal prism shape to electrically connect a corresponding pad electrode to the common electrode. The display apparatus may further include a feedback line, and a common voltage compensator. The feedback line may be disposed in the peripheral area and provide a common voltage feedback. The common voltage compensator may generate a compensation signal based on the common voltage feedback. The power supply may generate a compensated common voltage based on the compensation signal and provide the compensating common voltage to the common voltage line.

In another exemplary embodiment of the present invention, a display apparatus includes a gate driver, a data driver, a display panel, a power supply and a common voltage line. The gate driver outputs gate signals, and the data driver outputs data signals. The display panel includes a display area to display images in response to the gate signal and the data signal, and a peripheral area surrounding the display area. The peripheral area includes a first peripheral area disposed at a first side of the display area and a second peripheral area disposed at a second side opposing to the first side with respect to the display area. The power supply generates a common voltage and supplies the common voltage to the display panel. The common voltage line is disposed through the peripheral area and surrounds the display area. The common voltage line has two ends adjacent to the power supply. One of the two ends, which is disposed farther away from the gate driver than the other one of the two ends, is connected to the power supply to receive the common voltage.

BRIEF DESCRIPTION OF THE DRAWINGS

Exemplary embodiments of the present invention will become more readily apparent by reference to the following detailed description when considered in conjunction with the accompanying drawings wherein.

DETAILED DESCRIPTION OF EXEMPLARY EMBODIMENTS

Figure 1:
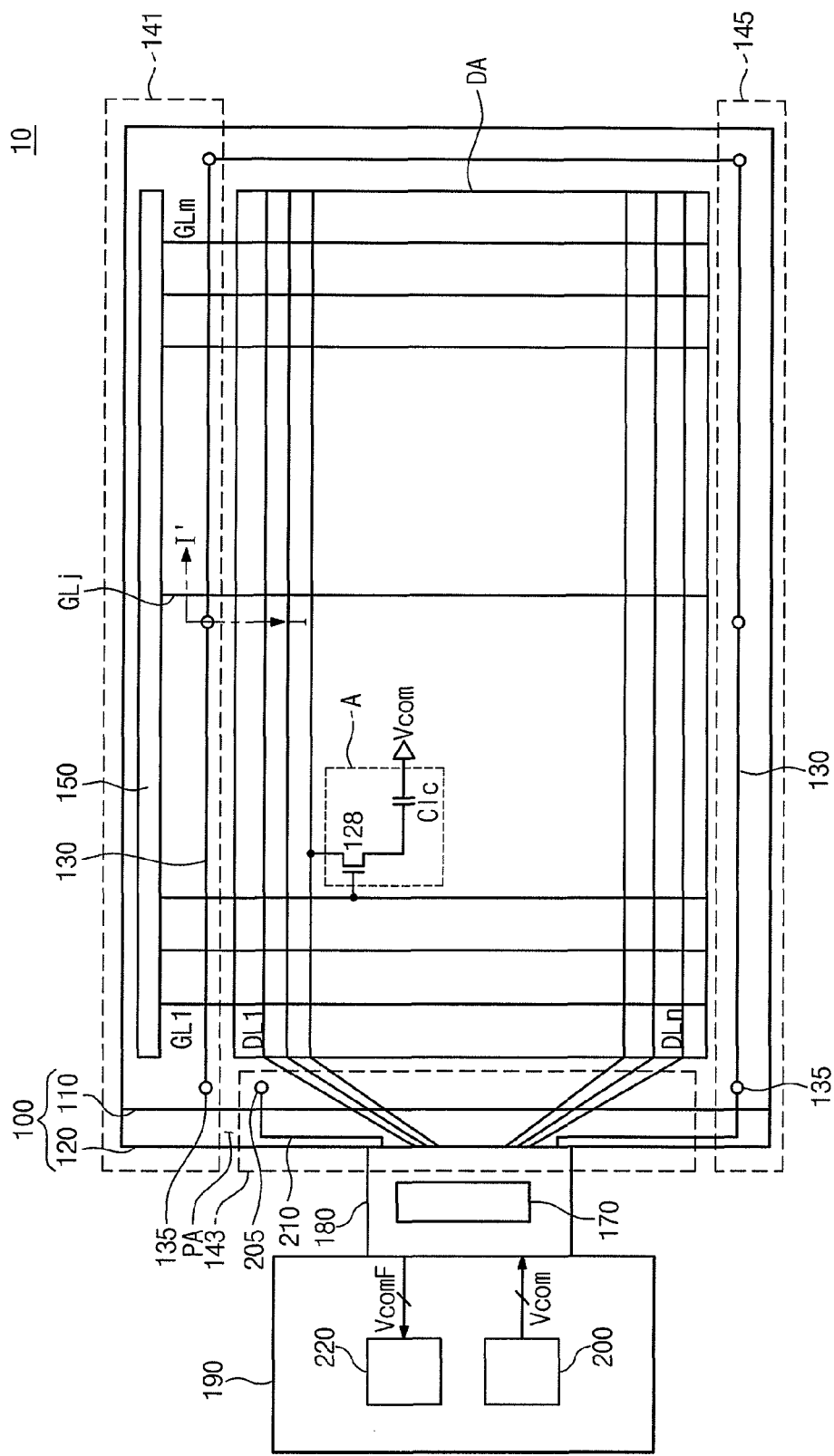
FIG. 1 is a view showing a display apparatus according to an exemplary embodiment of the present invention.

Hereinafter, exemplary embodiments the present invention will be explained in more detail with reference to the accompanying drawings. However, the scope of the present disclosure is not limited to such embodiments and the present invention may be realized in various forms. The same reference numerals are used to designate the same elements throughout the drawings.

Figure 2:
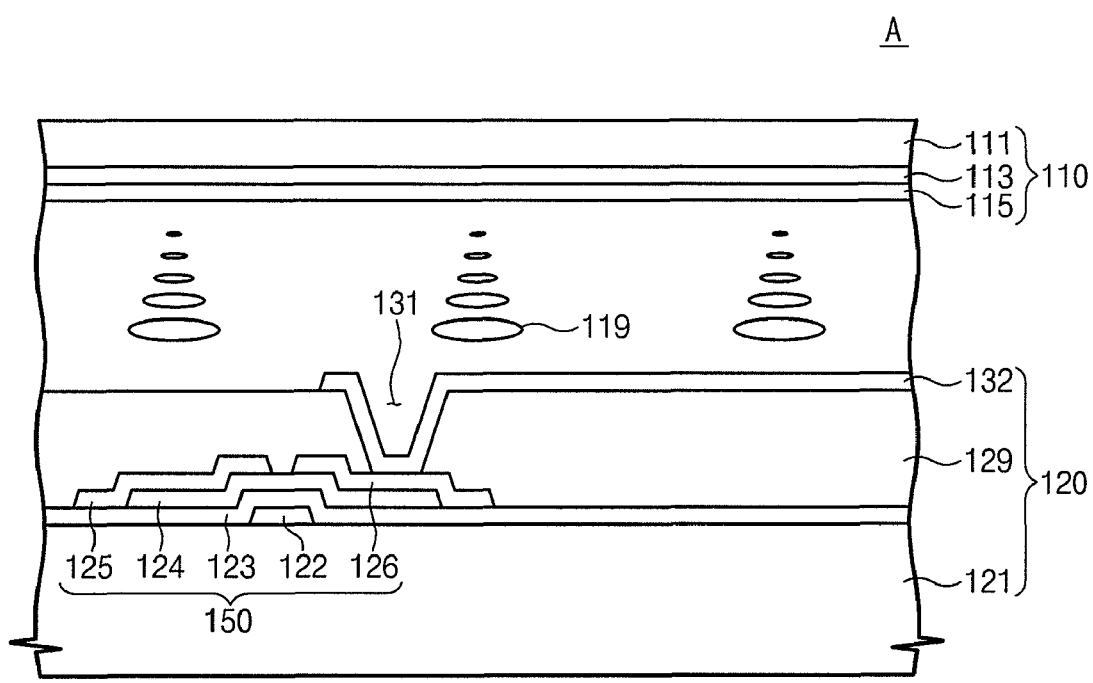
FIG. 2 is an enlarged sectional view of a portion A shown in FIG. 1.
Figure 3:
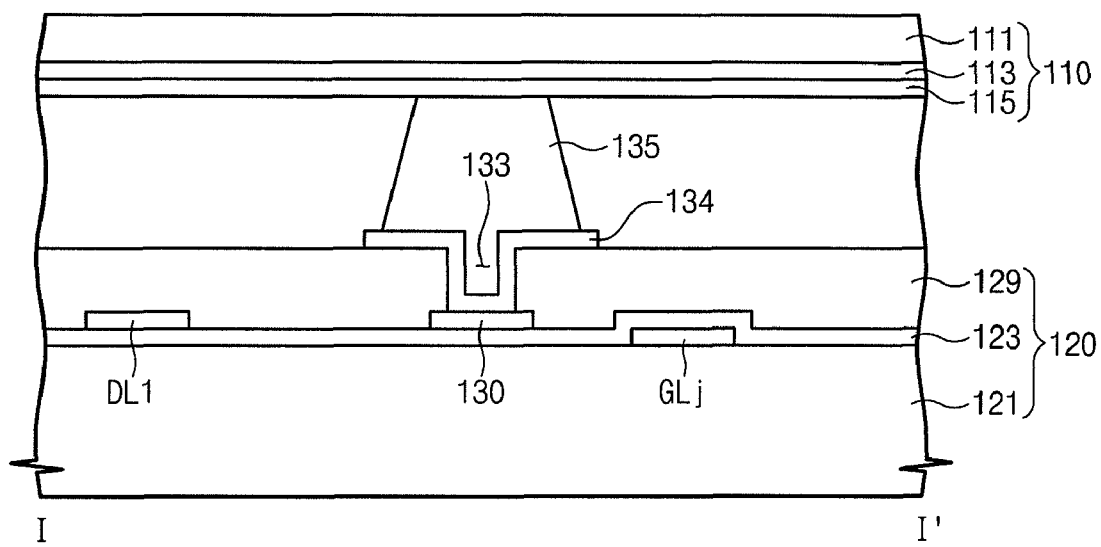
FIG. 3 is a sectional view taken along line I-I' shown in FIG. 1.

FIG. 1 is a view showing a display apparatus according to an exemplary embodiment of the present invention, FIG. 2 is an enlarged sectional view of a portion A shown in FIG. 1, and FIG. 3 is a sectional view taken along line I-I' shown in FIG. 1.

Referring to FIGS. 1, 2 and 3, a display apparatus 10 includes a display panel 100, a gate driver 150, a data driver 170 and a power supply 200. The display panel 100 includes a display area DA displaying an image and a peripheral area PA surrounding the display area DA. The display panel 100 includes a color filter substrate 110, an array substrate 120 facing the color filter substrate 110, and liquid crystals 119 interposed between the color filter substrate 110 and the array substrate 120.

The color filter substrate 110 includes a first base substrate 111, a color filter 113, and a common electrode 115. The color filter substrate 110 is coupled to the array substrate 120. The color filter 113 and the common electrode 115 are provided on a first base substrate 111. The color filter 113 may include color pixels having red, green and blue colors. The common electrode 115 may be formed on the entire surface of the color filter substrate 110. The common electrode 115 may receive a common voltage Vcom from an external source.

A plurality of pixels are arranged in the display area DA of the array substrate 120 in a matrix pattern. A plurality of gate lines GL1 to GLm and a plurality of data lines DL1 to DLn are arranged in the display area DA of a second base substrate 121. The gate lines GL1 to GLm extend in a first direction and are spaced apart from each other at regular intervals. The data lines DL1 to DLn extend in a second direction substantially perpendicular to the first direction and are spaced apart from each other at regular intervals. The gate lines GL1 to GLm and the data lines DL1 to DLn are provided on different layers. The gate lines GL1 to GLm are insulated from the data lines DL1 to DLn while crossing the data lines DL1 to DLn.

A plurality of pixel areas are defined on the display area DA by the gate lines GL1 to GLm and the data lines DL1 to DLn. Pixels are arranged in the pixel areas, respectively. Each pixel includes a thin film transistor 128 and a pixel electrode 132. The pixel electrode 132 is connected to the thin film transistor 128 and generates an electric field in cooperation with the common electrode 115 to form a liquid crystal capacitor C1c.

The thin film transistor 128 includes a gate electrode 122 provided on the second base substrate 121, an insulating layer 123 provided on the gate electrode 122, a semiconductor layer 124 overlapping the gate electrode 122, and source and drain electrodes 125 and 126 that are provided on the insulating layer 123 and the semiconductor layer 124. The thin film transistor 128 is protected from external impacts by a protection layer 129. The pixel electrode 132 is connected to the drain electrode 126 through a first contact hole 131 formed through the protection layer 129.

The peripheral area PA of the array substrate 120 includes a first section 141 in which the gate driver 150 is arranged, a second section 143 to which the data driver 170 is connected, and a third section 145 facing the first section 141, where the display area DA is interposed between the first and third sections 141 and 145. A common voltage line 130 and a conductive spacer 135 are provided in the peripheral area PA.

The common voltage line 130 surrounds the display area DA. The common voltage line 130 is arranged in the first section 141 to cross the gate lines GL1 to GLm. The common voltage line 130 may be disposed on the same layer as the data lines GL1 to GLn. For example, the common voltage line 130 may cross a $j^{th}$ gate line GLj while the insulating layer 123 is interposed therebetween, and the common voltage line 130 may be disposed in parallel to the first data line DL1.

The conductive spacer 135 is interposed between the array substrate 120 and the color filter substrate 110. The conductive spacer 135 overlaps the common voltage line 130. A conductive spacer 135 may be disposed on each pad electrode 134 connected to the common voltage line 130. For example, FIG. 1 illustrates use of several conductive spacers 135. The pad electrode 134 is connected to the common voltage line 130 through a second contact hole 133 formed through the protection layer 129. The pad electrode 134 may be formed on the same layer as the pixel electrode 132. The conductive spacer 135 may include a conductive material having a polygonal prism shape to electrically connect the pad electrode 134 to the common electrode 115.

The gate driver 150 may include an amorphous silicon transistor formed in the first section 141. The gate driver 150 may be directly formed together with the thin film transistor 128 on the array substrate 120. The gate driver 150 is provided in the peripheral area PA to sequentially apply a gate signal including a gate on voltage and a gate off voltage to the gate lines GL1 to GLm.

The data driver 170 may be a single chip and may be mounted on a flexible circuit film 180. The data driver 170 is connected to the data lines DL1 to DLn provided in the second section 143 through the flexible circuit film 180. The flexible circuit film 180 includes a flexible material and is provided with a plurality of interconnections to transmit the signal. The data driver 170 provides a data signal to the data lines DL1 to DLn. The data driver 170 can invert a polarity of the data signal applied to the pixel electrode 132.

The power supply 200 may be mounted on a printed circuit board 190 such that the printed circuit board 190 is electrically connected to the flexible circuit film 180 on which the data driver 170 is mounted. The power supply 200 supplies the DC common voltage Vcom to the common voltage line 130 through the flexible circuit film 180. The power supply 200 provides a drive voltage to the gate driver 150 and the data driver 170. The printed circuit board 190, on which the power supply 200 is mounted, includes an interconnection provided to transmit the signal and a pad electrode connected to the flexible circuit film 180.

The display apparatus 10 further includes a feedback line 210 provided in the peripheral area PA of the array substrate 120 and a common voltage compensator 220 provided to supply a compensation signal to the power supply 200.

The feedback line 210 provided in the peripheral area PA is connected to a feedback conductive spacer 205. The feedback line 210 may be formed on the same layer as the common voltage line 130 such that the feedback line 210 is connected to the flexible circuit film 180. The feedback line 210 provides a common voltage feedback VcomF to the common voltage compensator 220.

The common voltage compensator 220 receives the common voltage feedback VcomF from the feedback line 210 and extracts a ripple voltage included in the common voltage feedback VcomF. The common voltage compensator 220 may provide a compensation signal having a phase opposite to that of the ripple voltage to the power supply 200. Accordingly, the power supply 200 may output the compensated common voltage Vcom. The common voltage compensator 220 may be provided in the power supply 200 or externally.

The common voltage Vcom is differentially applied to the common electrode 115 according to a difference in a kickback voltage generated from the display panel 100.

The kickback voltage represents a voltage difference of the data signal occurring when the data signal is subject to a voltage shift caused by a parasitic capacitance between the gate electrode 122 and the drain electrode 126 in the thin film transistor 128. The kickback voltage may be expressed Equation 1 as follows:

$$Vk = \frac{Cgd}{Clc + Cgd}(Von - Voff),\qquad \text{[Equation 1]}$$

where the Vk represents the kickback voltage, and Cgd represents the parasitic capacitance between the gate electrode 122 and the drain electrode 126. Further, C1c, Von and Voff represent the capacitance of the liquid crystal capacitor, the gate on voltage, and the gate off voltage, respectively.

In the gate lines GL1 to GLm, the voltage level of the gate on voltage Von is lowered proportionally to a distance relative to the first section 141 due to a resistance and the parasitic capacitance. Accordingly, a difference between the gate on voltage Von and the gate off voltage Voff is decreased along the gate lines GL1 to GLm proportionally to the distance relative to the first section 141. Since the kickback voltage Vk is proportional to the difference between the gate on voltage Von and the gate off voltage Voff, a first end of the gate lines GL1 to GLm disposed in the first section 141 has a kickback voltage greater than that of a second end of the gate lines GL1 to GLm adjacent to the third section 145.

The common voltage Vcom is differentially applied to the first section 141 and the third section 145, respectively, to prevent a flicker generated by the kickback voltage Vk. The common voltage Vcom having a low level is applied to the first section 141 having a greater kickback voltage Vk and the common voltage Vcom having a high level is applied to the third section 143 having a smaller kickback voltage Vk. Since the common voltage Vcom having the high level is applied to the third section 145 having the smaller kickback voltage Vk, a coupling effect of the parasitic capacitor Cgd may be reduced, and thereby the flicker may be prevented.

A first end of the common voltage line 130 disposed in the second section 143 is connected to the power supply 200 to apply the common voltage Vcom corresponding to the kickback voltage Vk. The common voltage line 130 surrounds the display area DA by sequentially passing over the first section 141 and the third section 145, so that a second end of the common voltage line 130 is disposed in the second section 143 adjacent to the power supply 200. The common voltage Vcom is decreased by a resistance and a parasitic capacitance of the common voltage line 130 from the first end to the second end of the common voltage line 130. Accordingly, the common voltage line 130 applies the differential common voltage Vcom to the common electrode 115 through the conductive spacer 135.

Although exemplary embodiments of the present invention have been described, it is understood that the present invention should not be limited to these exemplary embodiments, and various changes and modifications can be made by one ordinary skilled in the art within the spirit and scope of the disclosure.

What is claimed is:

1. A display apparatus comprising:
   a gate driver that outputs gate signals;
   a data driver that outputs data signals;
   a display panel including a display area to display images in response to the gate signal and the data signal, and a peripheral area surrounding the display area, wherein the peripheral area includes a first peripheral area disposed above the display area and a second peripheral area disposed below the display area;
   a power supply that generates a common voltage and supplies the common voltage to the display panel; and
   a common voltage line that is disposed through the peripheral area, wherein the common voltage line which is surrounding the display area has two ends adjacent to the power supply, wherein one of the two ends, which is disposed farther away from the gate driver than the other one of the two ends, is connected to the power supply to receive the common voltage.

2. The display apparatus of claim 1, wherein the gate driver and the power supply are provided near different adjacent sides of the display panel, respectively.

3. The display apparatus of claim 2, wherein the gate driver comprises an amorphous silicon transistor formed in the peripheral area.

4. The display apparatus of claim 1, wherein the display panel comprises:
   a first substrate to which the gate driver and the data driver are connected;
   a second substrate coupled to the first substrate; and
   a liquid crystal layer interposed between the first substrate and the second substrate.

5. The display apparatus of claim 4, wherein the first substrate comprises a gate line connected to the gate driver, a data line crossing the gate line, and a pixel electrode electrically connected to the gate line and the data line,
   and the second substrate comprises a common electrode to which the common voltage is applied.

6. The display apparatus of claim 5, wherein the common voltage line is insulated from the gate line in the peripheral area adjacent to the gate driver while crossing the gate line.

7. The display apparatus of claim 6, wherein the common electrode line is disposed on a same layer with the data line.

8. The display apparatus of claim 5, wherein the display panel comprises a spacer interposed between the common voltage line and the common electrode.

9. The display apparatus of claim 8, wherein the spacer is disposed in the peripheral area.

10. The display apparatus of claim 9, wherein the spacer overlaps the common voltage line such that the spacer is connected to the common electrode.

11. The display apparatus of claim 1, wherein the data driver is a single chip and is connected to the display panel adjacent to the power supply.

12. The display apparatus of claim 1, further comprising a printed circuit board connected to the display panel to mount the power supply thereon.

13. A display apparatus comprising:
   a display panel including a display area to display an image and a peripheral area surrounding the display area; and
   a power supply that generates a common voltage and supplies the common voltage to the display panel,
   wherein the display panel comprises:
   a first substrate;
   a second substrate facing the first substrate;
   a liquid crystal layer interposed between the first substrate and the second substrate;
   a common voltage line that is disposed through the peripheral area, wherein the common voltage line which is surrounding the display area has two ends adjacent to the power supply, wherein one of the two ends, which is disposed farther away from a gate driver than the other one of the two ends, is connected to the power supply to receive the common voltage; and at least one spacer interposed between the first substrate and the second substrate and overlapping the common voltage line.

14. The display apparatus of claim 13, further comprising a pad electrode disposed between the common voltage line and each spacer.

15. The display apparatus of claim 14, wherein each spacer comprises a conductive material having a polygonal prism shape to electrically connect a corresponding pad electrode to the common electrode.

16. The display apparatus of claim 13, further comprising:
a feedback line disposed in the peripheral area and providing a common voltage feedback; and
a common voltage compensator generating a compensation signal based on the common voltage feedback,
wherein the power supply generates a compensated common voltage based on the compensation signal and provides the compensating common voltage to the common voltage line.

17. The display apparatus of claim 16, wherein the common voltage compensator generates the compensation signal by extracting a ripple voltage included in the common voltage feedback and setting the compensation signal to have a phase opposite to that of the ripple voltage.

18. The display apparatus of claim 16, wherein the gate driver disposes in a first section of the peripheral area that is adjacent to a first side of the display area and provides a gate signal to the display panel,
wherein the common voltage line initially receives the compensating common voltage from the power supply through a second section of the peripheral area that is adjacent to a second side of the display area and the feedback line is disposed in the second section.

19. The display apparatus of claim 18, wherein the common voltage line sequentially passes over the second section of the peripheral area, a third section of the peripheral area, and the first section of the peripheral area, wherein the third section is adjacent to a third side of the display area and the first and third sections face one another.

20. A display apparatus comprising:
a gate driver that outputs gate signals;
a data driver that outputs data signals;
a display panel including a display area to display images in response to the gate signal and the data signal, and a peripheral area surrounding the display area, wherein the peripheral area includes a first peripheral area disposed at a first side of the display area and a second peripheral area disposed at a second side opposing to the first side with respect to the display area;
a power supply that generates a common voltage and supplies the common voltage to the display panel; and
a common voltage line that is disposed through the peripheral area, wherein the common voltage line which is surrounding the display area has two ends adjacent to the power supply, wherein one of the two ends, which is disposed farther away from the gate driver than the other one of the two ends, is connected to the power supply to receive the common voltage.

* * * * *